(12) United States Patent
Takeuchi et al.

(10) Patent No.: US 6,315,937 B1
(45) Date of Patent: Nov. 13, 2001

(54) MINUTELY WORKING PROCESS

(75) Inventors: Kazutaka Takeuchi, Yokohama; Ichiro Maekawa, Kawasaki; Yasuhiro Tanaka, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/349,009

(22) Filed: Jul. 7, 1999

(30) Foreign Application Priority Data

Jul. 9, 1998 (JP) .................................................. 10-210456
Apr. 28, 1999 (JP) .................................................. 11-121301

(51) Int. Cl.$^7$ .................................................. B29C 59/02
(52) U.S. Cl. .......................... 264/293; 264/313; 264/316
(58) Field of Search .................................... 264/1.32, 2.2, 264/2.7, 293, 313, 316

(56) References Cited

U.S. PATENT DOCUMENTS

| | | | | |
|---|---|---|---|---|
| 3,607,992 | * | 9/1971 | Scheiding | 264/293 X |
| 5,500,157 | * | 3/1996 | Graebner et al. | 264/293 X |
| 5,728,324 | * | 3/1998 | Welch et al. | 264/2.5 |

* cited by examiner

*Primary Examiner*—Leo B. Tentoni
(74) *Attorney, Agent, or Firm*—Robin, Blecker & Daley

(57) ABSTRACT

A minutely working method of and apparatus for opposing the surface of a transfer member having a concave or convex pattern formed on the surface thereof and the surface of a workpiece to each other, heating the transfer member and thermally expanding the transfer member in the direction of a normal to the surface thereof to thereby transfer the concave or convex pattern to the workpiece.

8 Claims, 11 Drawing Sheets

MINUTELY WORKING PROCESS

BACKGROUND OF THE INVENTION

1. Field of the Invention

This invention relates to a minutely working method of and apparatus for forming a minute working pattern on a surface, and precisely manufacturing a lens sheet optical element such as a lenticular lens or a Fresnel lens, an orifice plate for an ink jet head, etc.

2. Related Background Art

A transmission type screen used in a projection television set generally comprises a Fresnel lens sheet functioning to condense incident light and disposed on a light source side, and a lenticular lens sheet disposed on an observer side to diffuse the incident light in a horizontal direction. Also, a contrivance for heightening contrast as by forming a black light absorbing port is provided between lenticular lenses in the lenticular lens sheet.

In recent years, however, the higher minuteness of the quality of clear vision, high vision, etc. has been advanced, and high resolution has also been required in the transmission type screen as described above. Accordingly, higher minuteness is also required of the aforementioned lens sheet, and with the higher minuteness of this lens sheet, the distance between lenses is shortened, and a thin lens sheet element is desired in order to shorten the optical path thereof. However, with the higher minuteness, the delicate minute working shape of the lens sheet such as the uniformity of the thickness thereof greatly affects the quality of image.

Also, for an orifice plate for an ink jet head, liquid crystal polymer, polysulfone or the like excellent in oil resistance and heat resistance is generally used as an ink applying port with oil resistance and also heat resistance in a thermal ink jet printer taken into account. Further, a contrivance such as controlling the surface energy of resin film is provided to improve the detachability of ink liquid.

In recent years, however, the resolution of the ink jet printer has been more and more improved and in the above-mentioned orifice plate or an orifice formed on the plate, it has become required to form a very minute shape highly accurately.

As methods of manufacturing an optical element such as a lens sheet, a semiconductor element or an orifice plate there are known, for example, the following methods.

(1) An extrusion heat melting molding method of subjecting a T die to minute working, and forming a continuous minute pattern in a taking-over direction, as described in Japanese Patent Application Laid-open No. 5-127258 and Japanese Patent Application Laid-open No. 9-043732, and a method of forming and transferring a continuous minute pattern on a take-up roll itself at that time.

(2) A casting method called the cast method of applying a predetermined amount of resin soluble in an organic solvent or the like in a molten state or the precursor or ungulvanized material thereof itself in a dissolved state to the inner surface or the outer surface of a mold, subjecting it to a desolvent process, and further heat-treating it as required, and thereafter peeling it.

(3) A photopolymer method using active energy ray curing type resin comprising ultraviolet ray curing type resin, as described in Japanese Patent Application Laid-open No. 8-328264.

(4) A heating press method of again pressing and heating a primary worked article such as a sheet or film of transparent resin to thereby form a minute pattern.

(5) A method of protecting only a necessary portion such as a resin plate, and removing an unnecessary portion by a solvent such as an acid or alkali or physical energy such as a laser beam, as described in Japanese Patent Application Laid-open No. 10-076668.

However, to make an optical element of higher minuteness, thin wall and uniform film thickness or an orifice plate of a convex type rectangular parallelepiped required by the use of the above-described minutely working method, the following various problems are encountered.

In the extrusion heat melting molding method of item (1) above, a continuous pattern of the same shape can be formed in the taking-over direction of the film or sheet, but a pattern in the non-taking-over direction cannot be formed. Also, it is difficult take up the extruded film or sheet by a roll machine or the like and therefore, to produce film or a sheet continuously, a very long take-over line is required and as the result, the cost is increased. Further, the uneven shape is crushed when the film or sheet passes the pressing roll.

Also, in the casting method and the photopolymer method of items (2) and (3) above, liquid resin is used and therefore, to obtain a sheet or film of a uniform film thickness, there are difficult problems such as the control of the density of the solution, the adjustment of drying atmosphere, the control of the entrainment of air bubbles, the solvent processing cost in the drying step and the fine adjustment of the application intensity of the active energy such as ultraviolet rays, and as the result, the degree of freedom lacks remarkably.

Further, the heating press method of item (4) above is a technique of reworking a primary molded article and is generally often used, but the heating press machine is very bulky and expensive and therefore, as the result, what is manufactured by the heating press method becomes expensive. Also, when in the heating press method, a sheet of a large area of 50 inches or greater is to be pressed, it is very difficult to uniformly maintain the temperature distribution of the entire surface, and the sheet becomes warped or the lens shape formed by a partial difference in the degree of crystallization may partly differ.

Also, in the method of item (5) removing only the unnecessary portion, when for example, a convex minute pattern is to be formed, most of it is an unnecessary portion and is the object to be removed, and this is irrational in both of production and cost.

SUMMARY OF THE INVENTION

It is an object of the present invention to solve the above-noted problems and to provide a minutely working method capable of manufacturing a minute working pattern accurately and inexpensively on the surface of resin film, a plate, a sheet, film or the like of a large area.

It is another object of the present invention to provide a minutely working apparatus which is capable of effecting highly accurate minute working and is high in productivity.

The minutely working method according to the present invention for achieving the above object is characterized by preparing at least one transfer member having a concave or convex pattern formed on the surface thereof, bringing the surface of the transfer member into contact with the surface of a workpiece, heating the transfer member with the position of the workpiece kept fixed and thermally expanding the transfer member in the direction of a normal to the surface to thereby transfer the concave or convex pattern to the workpiece.

Also, the minutely working method according to the present invention is characterized by preparing at least one transfer member having a concave or convex pattern formed on the surface thereof, stacking the transfer member, a workpiece and a pressing member so that the surface of the transfer member may contact with the surface of the workpiece, heating the pressing member with the position of the workpiece kept fixed, and thermally expanding the pressing member to thereby urge the concave or convex pattern of the transfer member against the surface of the workpiece and transfer the concave or convex pattern to the workpiece.

The minutely working method according to the present invention is characterized by the steps of stacking in a metallic box body a pressing plate having a coefficient of thermal expansion greater than that of the box body, thermoplastic resin film lower in heat resistance than the pressing plate, and a transfer plate having a minute concave or convex pattern formed on the surface thereof, and heating the box body to thereby press and transfer the minute concave or convex pattern of the transfer plate to the surface of the thermoplastic resin film.

The minutely working apparatus according to the present invention is provided with a metallic box body having heating means for heating from the outside, a pressing plate disposed in the box body and having a coefficient of thermal expansion greater than that of the box body, and a transfer plate stacked on the pressing plate and having minute working formed on one surface thereof, characterized in that thermoplastic resin film lower in heat resistance than the transfer plate is stacked with the pressing plate and the transfer plate, and the box body is heated by the heating means to thereby press and transfer the minutely wrought surface of the transfer plate to the surface of the thermoplastic resin film and form a minute pattern.

DESCRIPTION OF THE PREFERRED EMBODIMENTS

Figure 1:
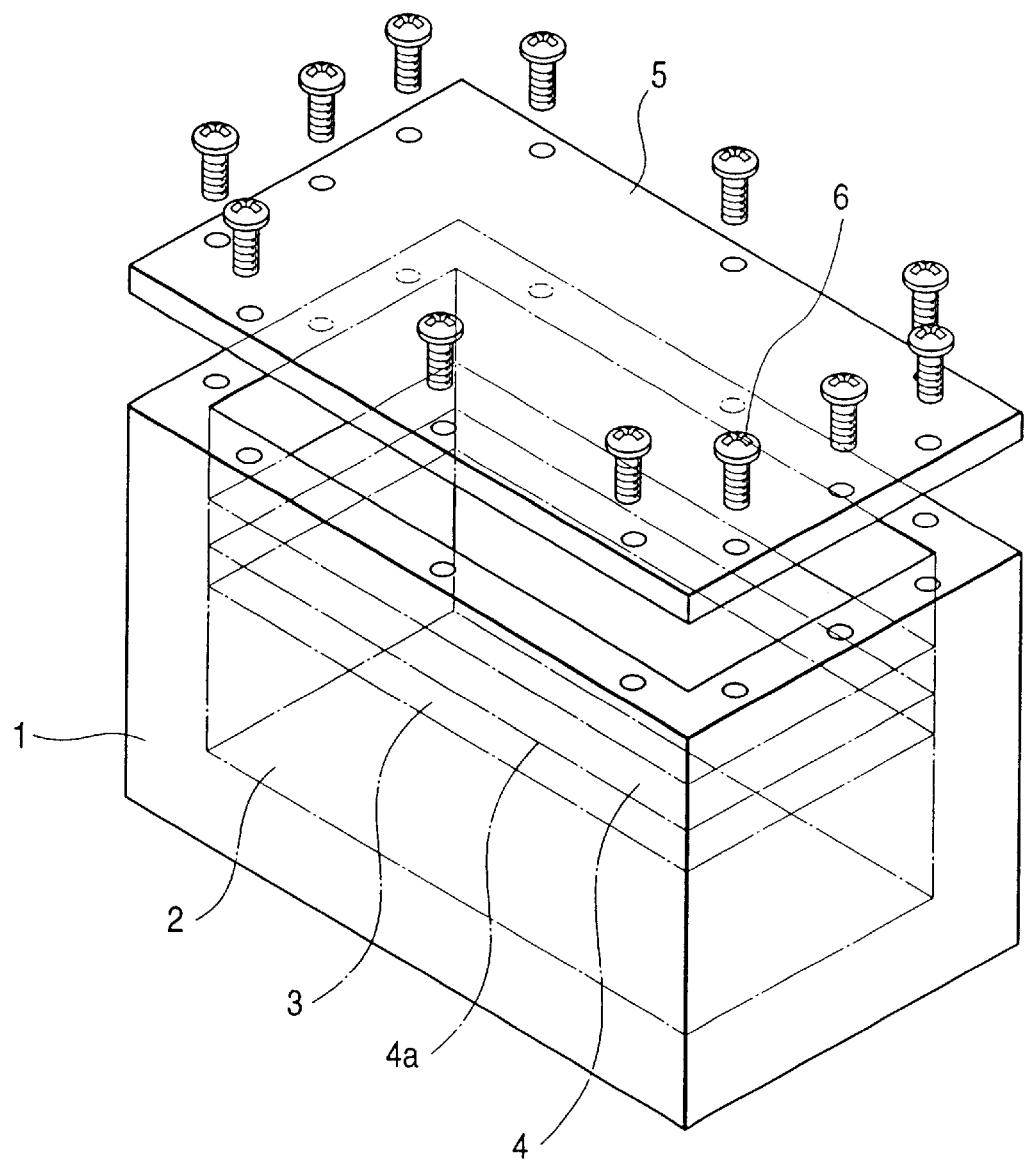
FIG. 1 is a schematic view of a first embodiment of the present invention.

The present invention will hereinafter be described in detail with respect to some embodiments thereof shown in the drawings.

Referring to FIG. 1 which is a schematic view of a first embodiment, a pressing plate 2 formed of polytetrafluoroethylene (PTFE resin) is horizontally disposed on the bottom portion of a box type member 1 made of stainless steel, an acrylic resin plate 3 is stacked on the upper surface of the pressing plate 2, and further a transfer plate 4 having a minutely working pattern surface 4a on the underside thereof is stacked on the resin plate 3 so as to contact with the resin plate 3. Also, a dimension regulating lid member 5 made of stainless steel is fixed to the upper portion of the box type member 1 by screws 6 made of stainless steel.

The dimensions of the box type member 1, the pressing plate 2 and the transfer plate 4 are chosen in conformity with the area of the resin plate 3 formed with the minutely working pattern, and for example to obtain a resin plate 3 of 500×500 mm, it is preferable to make the surface shapes of the box type member 1, the pressing plate 2 and the transfer plate 4 coincident with 500×500 mm.

Figure 2:
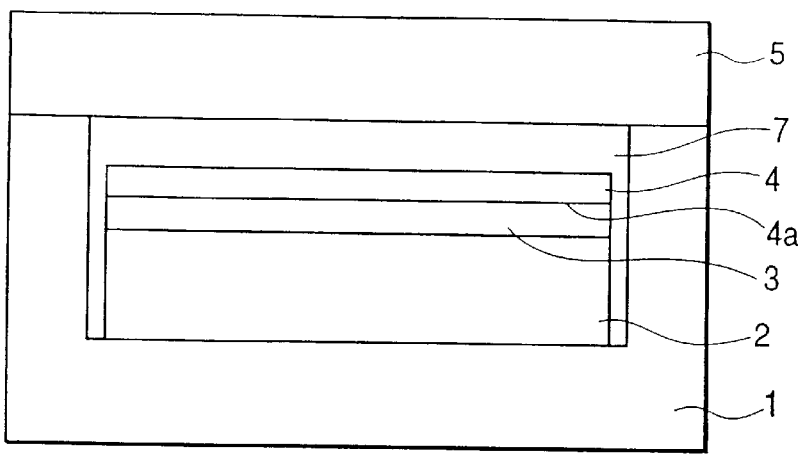
FIG. 2 is a cross-sectional view of a box type member before heated.

FIG. 2 is a cross-sectional view of the box type member 1 before heated, and the pressing plate 2 having a thickness of 15 mm, the resin plate 3 of acrylic resin such as methylmethacrylate having a thickness of 2 mm and the transfer plate 4 having a thickness of 2 mm are stacked on the box type member 1 of which the height of the inner surface is 20 mm, whereby a free space 7 of 1 mm is provided in advance.

Figure 3:
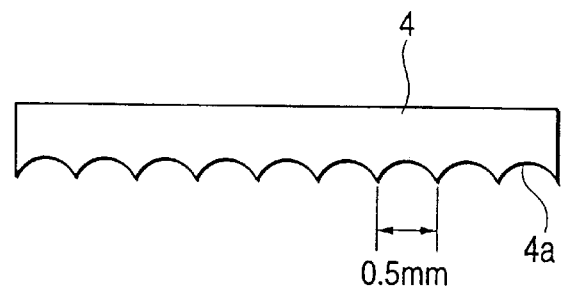
FIG. 3 is a cross-sectional view of a metal mold for molding a lenticular lens.

FIG. 3 shows an enlarged cross-sectional view of the minutely working pattern surface 4a of the transfer plate 4, which is a metal mold for molding a lenticular lens provided with a minutely working pattern comprising semicircles of a diameter 0.5 mm for a lenticular lens arranged without any gap.

Figure 4:
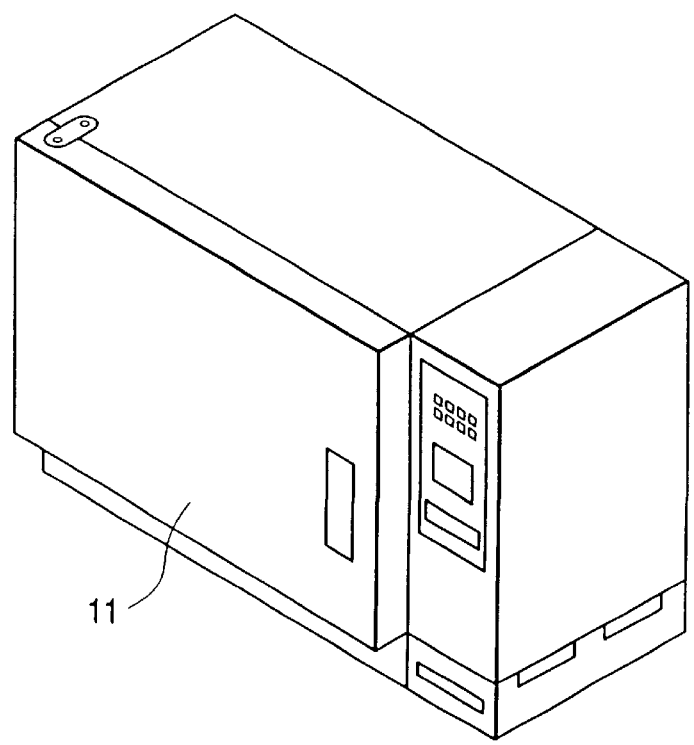
FIG. 4 is a schematic view of a heating surface.

Next, the box type member 1 having the pressing plate 2, the resin plate 3 and the transfer plate 4 stacked thereon and having the lid member 5 fixed thereto is placed into a heating furnace 11 shown in FIG. 4, and heating is started. The heating condition in the heating furnace 11 is, for example, heating time 60±1 minutes at heating temperature 200±5° C., and this heating condition is determined with the melting temperature and thermal deterioration of the resin plate 3 taken into account. At the heating step in the heating furnace 11, the relations among the pressing plate 2, the resin plate 3 and the transfer plate 4 stacked in the box type member 1 are gradually changed.

Figure 5:
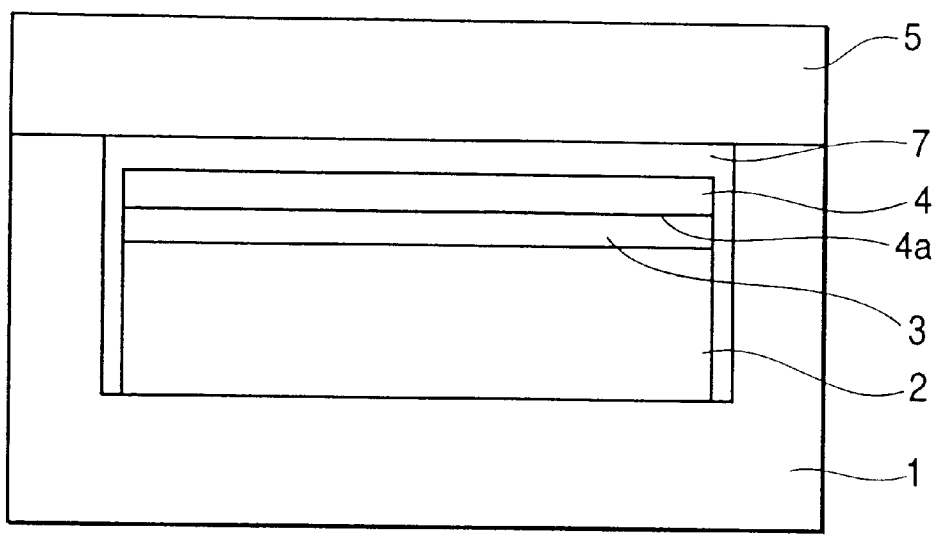
FIG. 5 is a cross-sectional view of the box type member being heated.

The coefficient of thermal expansion of the box type member 1, the transfer plate 4 and the lid member 5 which are formed of stainless steel is $1.2 \times 10^{-5}$ (/K), and the coefficient of thermal expansion of the pressing plate 2 formed of PTFE resin is $1.0 \times 10^{-4}$ (/K), and the box type member 1 expands with temperature rise in conformity with its coefficient of thermal expansion, but when it is being heated, as shown in FIG. 5, the free space 7 is more reduced than before it is heated as shown in FIG. 2 because the coefficient of thermal expansion of the pressing plate 2 is greater than the coefficient of thermal expansion of the box type member 1.

Figure 6:
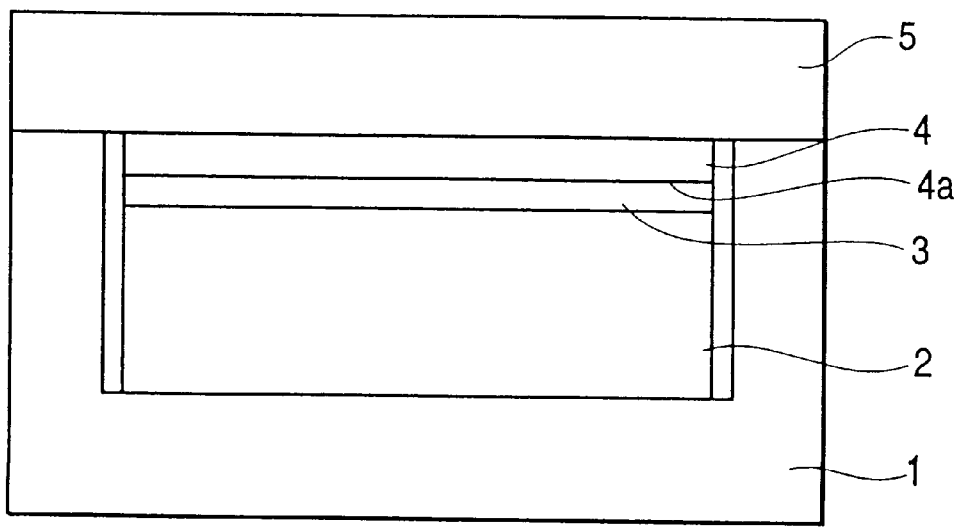
FIG. 6 is a cross-sectional view of the box type member when it has reached a heating temperature.

With this decrease in the gap of the free space 7, the resin plate 3 lower in thermal deformation temperature than the pressing 2 and the transfer plate 4 is softened. Also, when the heating temperature reaches 200° C., the free space 7 disappears as shown in FIG. 6, and the minutely working pattern surface 4a of the transfer 4 is reversed and transferred to the surface of the resin plate 3, and the film thickness of the resin plate 3 is generally uniformized.

Figure 7:
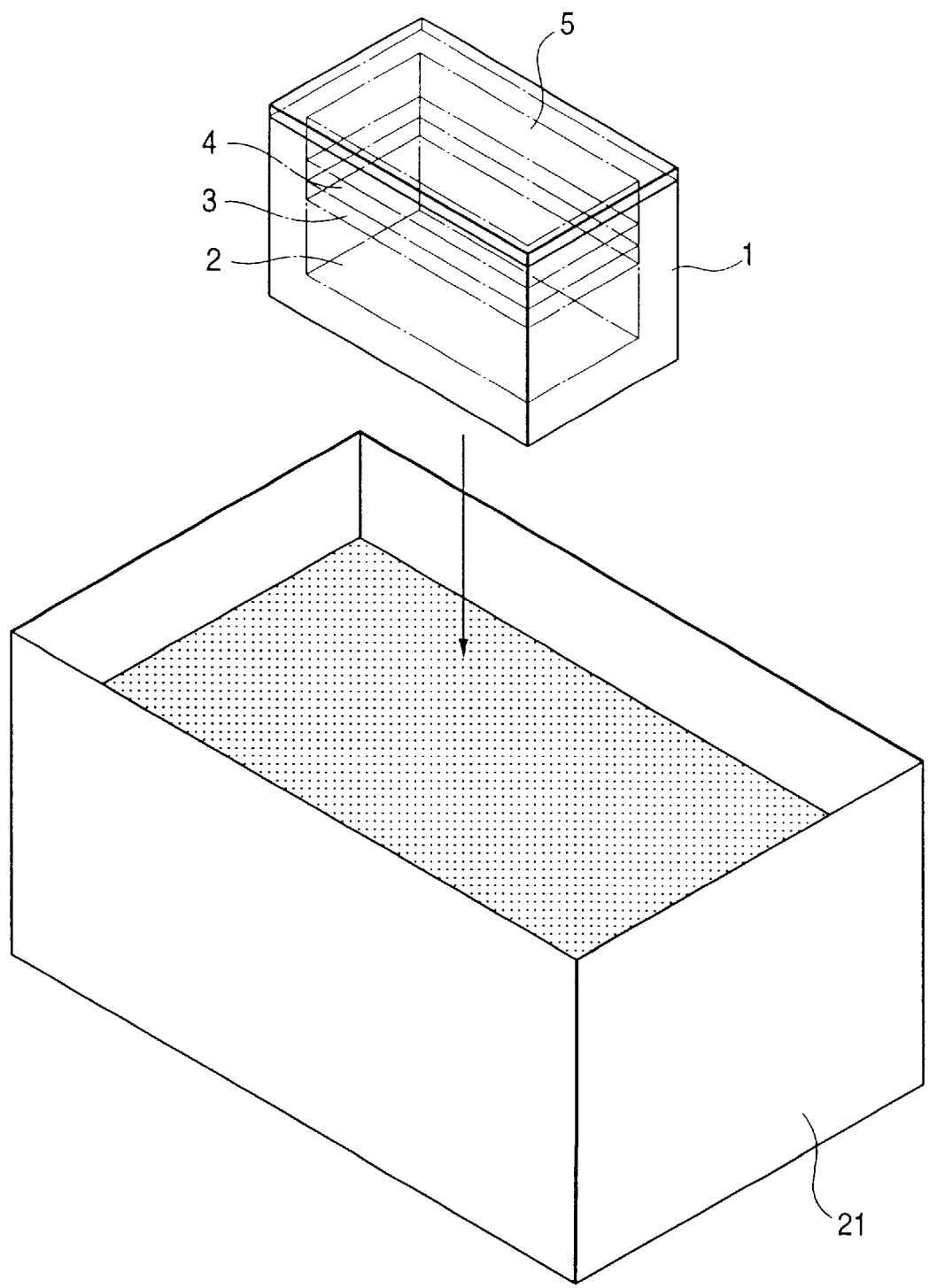
FIG. 7 is a schematic view of the cooling step.

Further, after the heating time of 60 minutes has passed, the heating is stopped and cooling is started. This cooling step may be intactly continued after the stoppage of the heating, but in order to shorten the cooling time, it is also possible to utilize a coolant such as water to quench as shown in FIG. 7. In the present embodiment, after the stoppage of the heating, the box type member 1 is immersed in the cooling water in a liquid tank 21 with a member therein and is cooled at a cooling speed of 170° C./min., and the box type member 1 is taken out of the liquid tank 21 after the room temperature is reached, and the lid member 5 is detached and the pressing plate 2, the transfer plate 4 and the resin plate 3 are taken out.

A minutely working pattern for a lenticular lens is reversed and transferred to the surface of the resin plate 3 thus taken out, and the resin plate 3 is molded as a lens sheet optical element presenting the minutely working pattern of a lenticular lens sheet.

As the resin plate 3 used in the present embodiment, use can be made of any one of resin film, a plate, a sheet and a film material formed of a thermoplastic resin material. Particularly, a material such as polyethylene, polypropylene, polymethyl-pentene-1, polystyrene, polyamide, polycarbonate, polysulfone, polyarylate, polyethylene terephthalate, acrylic resin, polybutylene terephthalate, polyphenylene sulfide, polyether sulfone, polyether imide, polyether nitrile, a thermoplastic polyimide material, polyether ether ketone, thermotropic liquid crystal polymer or polyamide acid is suitable. Film comprising at least one kind of organic or inorganic fine powder combined with one of the above-mentioned resin material to improve heat resistance, electrical conductivity, heat conductivity, etc., or film drawn and strengthened at all magnifications can also be used.

Particularly, when the resin plate 3 is used as an optical element, a homopolymer of methyl acrylate or methyl methacrylate, a copolymer thereof, acrylic resin such as a copolymer of methyl acrylate, (metha) acrylic acid ethyl, (metha) acrylic acid butyl and (metha) acrylonitrile, or transparent resin such as polycarbonate, polyarylate, polystyrene, polyether sulfone, polymethyl bentene or non-crystalline polyolefin is suitable.

Figure 8:
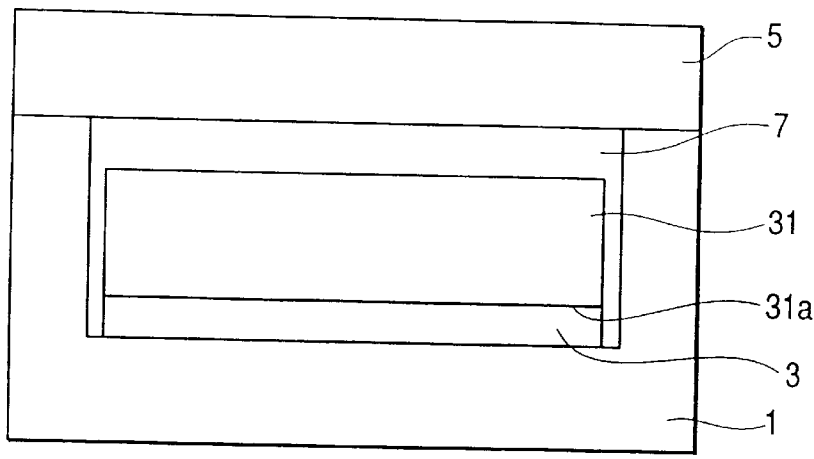
FIG. 8 is a cross-sectional view of a box type member before heated in a second embodiment of the present invention.

In FIG. 8 which is a cross-sectional view of a box type member 1 according to a second embodiment, the same members as those in the first embodiment are given the same reference numerals. In the present embodiment, the pressing plate 2 in the first embodiment is not used, but the transfer plate 4 is made to perform the pressing function also, and is made into a pressing plate and transfer plate 31. The materials, shapes and working step of the box type member 1 and the resin plate 3 used in the present embodiment are similar to those in the first embodiment, but PTFE resin is used as the material of the pressing plate and transfer plate 31, and a minutely working pattern for a circular Fresnel lens sheet of a pitch 0.15 mm is formed on the minutely working pattern surface 31a thereof.

The resin plate 3 is horizontally disposed on the bottom portion of the box type member 1, and the pressing plate and transfer plate 31 having the minutely working pattern surface 31a is stacked on the resin plate 3 so as to contact with the latter, and as in the first embodiment, the free space 7 in the box type member 1 is preset so as to disappear when it is heated to 200° C., and the lid member 5 is fixed to the box type member 1, and molding is effected under a heating condition and a cooling condition similar to those in the first embodiment.

Thereby, the minutely working pattern surface 31a of the pressing plate and transfer plate 31 for a Fresnel lens is reversed and transferred to the surface of the molded resin plate 3, and the resin plate 3 is molded as a lens sheet optical element presenting the minutely working pattern of a Fresnel lens sheet.

Also, on the surface on which this minutely working pattern has been molded, it is difficult for stress to the resin plate 3 to be produced and pressure is uniformly transmitted and molten resin flows into every corner of the gap in the pressing plate and transfer plate 31 and as the result, a very clear-cut transfer surface is formed, because the property of each substance such as the coefficient of thermal expansion is utilized and not only the molded surface but also the entire resin plate 3 has been heated. The surface roughness or the like of the molded resin plate 3 is of substantially the same value as that of the pressing plate and transfer plate 31.

Figure 9:
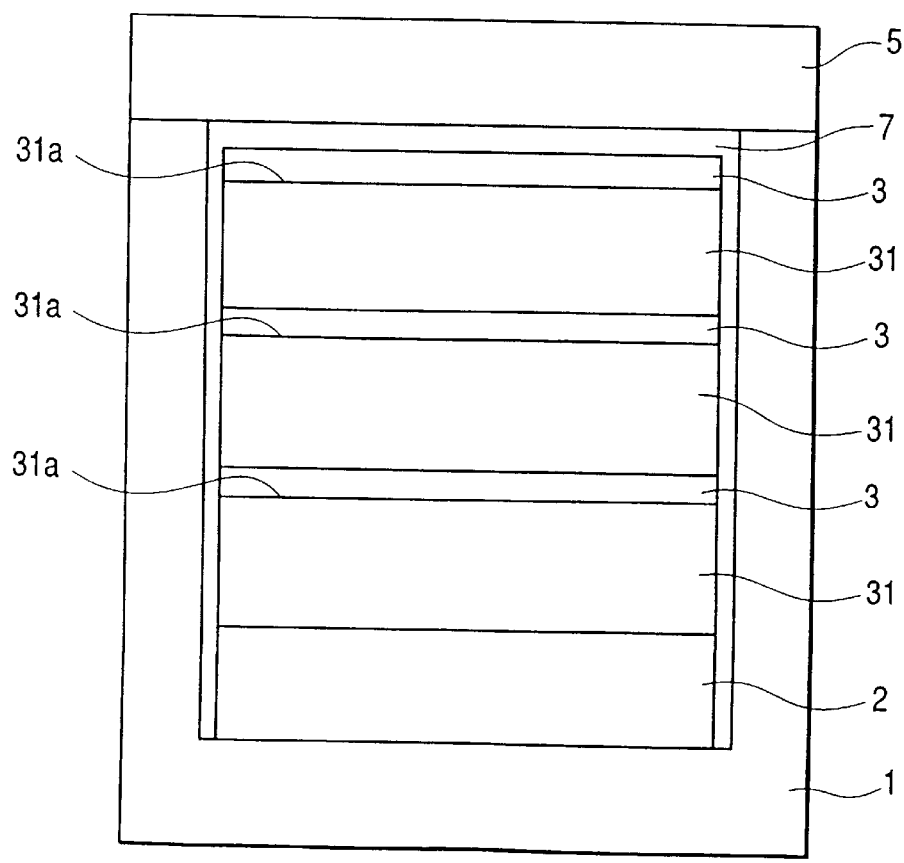
FIG. 9 is a cross-sectional view of a box type member before heated in a third embodiment of the present invention.

Referring to FIG. 9 which is a cross-sectional view of a box type member 1 according to a third embodiment, a plurality of resin plates 3 and a plurality of pressing plates and transfer plates 31 are alternately stacked on a pressing plate 2 in the box type member 1, and a plurality of lens sheets are molded at a time to thereby improve productivity. In the present embodiment, for example, a combination of three sets of pressing plates and transfer plates 31 and resin plates 3 is used to form three lens sheets at a time.

A pressing plate and transfer plate 31 is stacked on the pressing plate 2 so that the minutely working pattern surface 31a thereof for a lenticular lens may face upwardly, and a resin plate 3 is stacked thereon, and likewise, a pressing plate and transfer plate 31, a resin plate 3, a pressing plate and transfer plate 31 and a resin plate 3 are stacked in the named order, and as in the previous embodiments, the free space 7 in the box type member 1 is preset so as to disappear when it is heated to 200° C., and after the lid member 5 is fixed, the box type member 1 is heated at 200° C., and after a heating time of 90 minutes has passed, the box type member is cooled at a cooling speed of 170° C./min.

The minutely working pattern surfaces 31a for a lenticular lens from the pressing plates and transfer plates 31 are reversed and transferred to the respective surfaces of the three molded resin plates 3, and the resin plates 3 are molded as lens sheet optical elements presenting the minutely working pattern of a lenticular lens. The molding time is extended to 1.5 times, but the three resin plates 3 are molded at a time and therefore, the molding time per one resin plate becomes a half and productivity is greatly improved. While in the present embodiment, an example in which three resin plates 3 have been molded at a time is shown, good moldability is exhibited even for four or more resin plates, and the molding time per one resin plate can be shortened along therewith.

Figure 10:
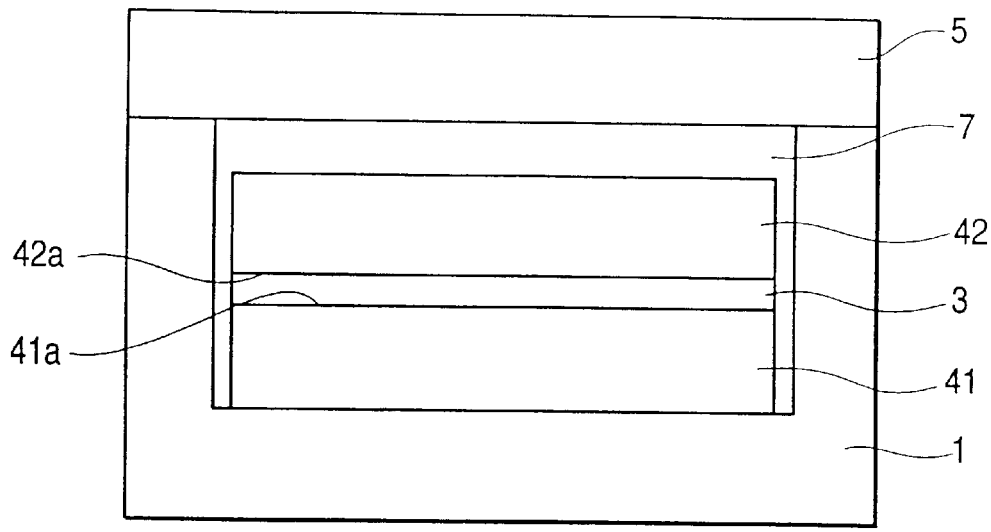
FIG. 10 is a cross-sectional view of a box type member before heated in a fourth embodiment of the present invention.

Referring to FIG. 10 which is a cross-sectional view of a box type member 1 according to a fourth embodiment, a pressing plate and a transfer plate 41 is disposed in the box type member 1 so that the minutely working pattern shape surface 41a thereof may face upwardly, and a resin plate 3 is stacked thereon. A pressing plate and transfer plate 42 is further stacked thereon so that the minutely working pattern surface 42a thereof may contact with the resin plate 3.

The respective minutely working pattern surfaces 41a and 42a of the pressing plates and transfer plates 41 and 42 formed of PTFE resin are provided with minutely working patterns, and for example, a minutely working pattern for molding a lenticular lens is formed on the minutely working pattern surface 41a, and a minutely working pattern for molding a Fresnel lens is formed on the minutely working pattern surface 42a.

As in the previous embodiments, the free space 7 in the box type member 1 is preset so as to disappear when the box type member is heated to 200° C., and the lid member 5 is fixed, whereafter molding is effected under a heating condition and a cooling condition similar to those in the previous embodiments.

Thereby, a minutely working pattern surface 41a for a lenticular lens from the pressing plate and transfer plate 41 and a minutely working pattern surface 42a for a Fresnel lens from the pressing plate and transfer plate 42 are reversed and transferred to the opposite surfaces of the resin plate 3, and the resin plate 3 is molded as a lens sheet optical element presenting the minutely working pattern of a lenticular lens on one surface thereof and the minutely working pattern of a Fresnel lens on the other surface thereof.

Figure 11:
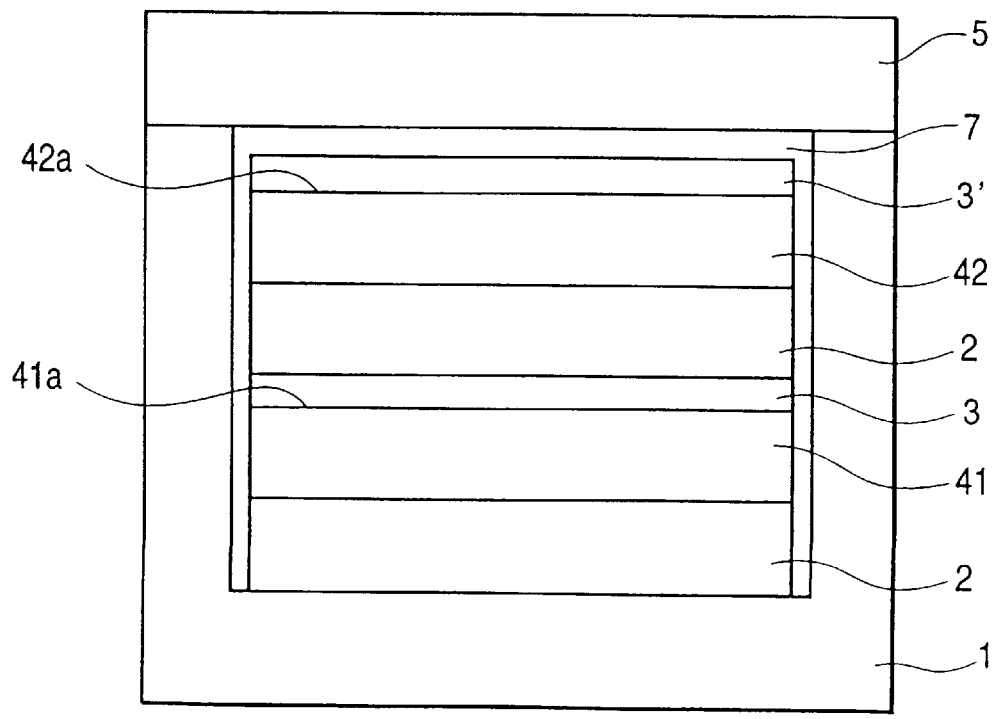
FIG. 11 is a cross-sectional view of a box type member before heated in a fifth embodiment of the present invention.

FIG. 11 is a cross-sectional view of a box type member 1 in a fifth embodiment, and a plurality of resin plates 3, 3' to be molded and a plurality of pressing plates and transfer plates 41, 42 of different shapes are disposed in the box type member 1, whereby a plurality of different minutely working patterns can be reversed and transferred at a time.

First, a pressing plate 2 is disposed in the box type member 1, and the pressing plate and transfer plate 41 is stacked thereon so that the minutely working pattern 41a thereof for a lenticular lens may face upwardly, and the resin plate 3 and the pressing plate 2 are stacked thereon, and the pressing plate and transfer plate 42 is likewise stacked so that the minutely working pattern surface 42a thereof for a Fresnel lens may face upwardly, and the resin plate 3' is further stacked thereon, and as in the previous embodiment, the resin plates 3 and 3' are molded by heating.

The minutely working pattern surface 41a for a lenticular lens and the minutely working pattern surface 42a for a Fresnel lens are reversed and transferred from the pressing plate and transfer plate 41 and the pressing plate and transfer plate 42, respectively, to the surfaces of the two molded resin plates 3 and 3', and the resin plates 3 and 3' are molded as lens sheet optical elements presenting a lenticular lens surface and a Fresnel lens surface, respectively.

While in the present embodiment, two lens sheet optical elements of different shapes are molded at a time, a good molding property can also be obtained for three or more lens sheet optical elements of different shapes or any combination.

Figure 12:
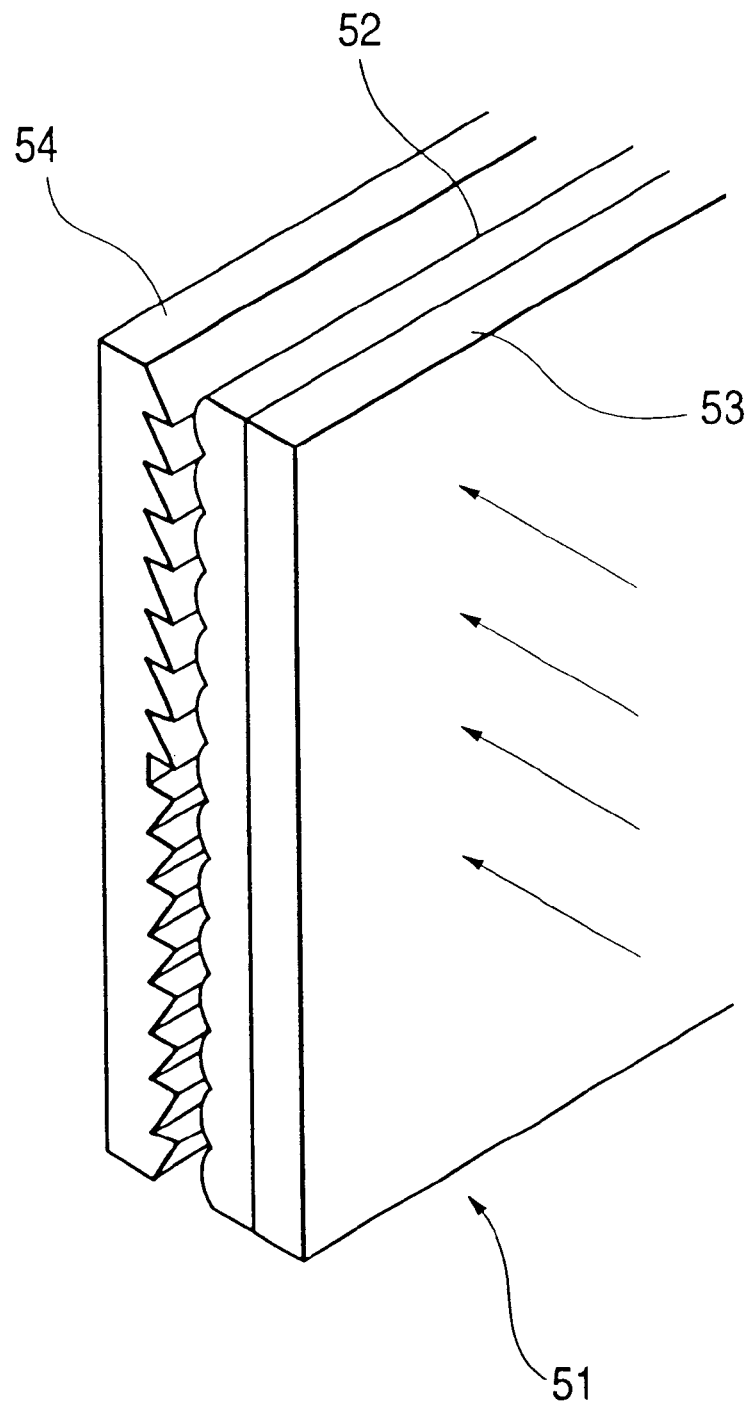
FIG. 12 shows the construction of a back transmitting type screen.

Also, lens sheet optical elements such as a Fresnel lens sheet and a lenticular lens sheet are used as a transmitting type screen for projection television, whereby there is obtained a projection television set which is inexpensive and good in productivity and which has a high quality of image. FIG. 12 shows a back transmitting type screen 51 using the Fresnel lens sheet and the lenticular lens sheet obtained in the previous embodiments, and a layered body comprising a lenticular lens sheet 52 and a light transmitting front plate 53 is disposed on a light source side, and a Fresnel lens sheet 54 is disposed on an observer side.

These sheets 52 and 54, in spite of their thicknesses becoming small, are uniform in the thickness of film and the lens shapes of the formed lens surfaces thereof are molded highly accurately and therefore, the lenticular lens surface of the lenticular lens sheet 52 and the Fresnel lens surface of the Fresnel lens sheet 54 can be opposed to each other to thereby make a transmitting type screen.

When the image on this back transmitting type screen 51 is observed by the use of a liquid crystal projector, there can be obtained an image of high quality having a wide angle of field and high resolution and free of a multiplex image, flare and distortion or the like.

Figure 13:
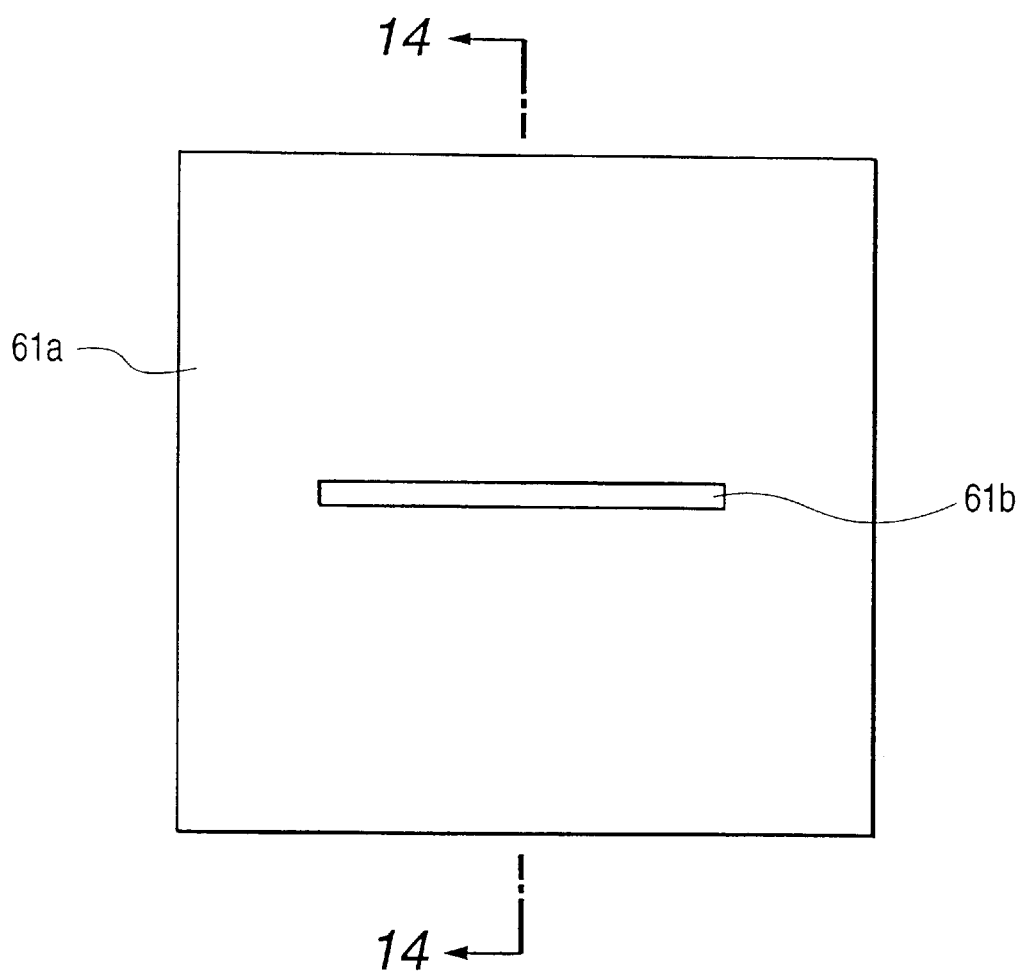
FIG. 13 is a bottom view of a transfer plate.
Figure 14:
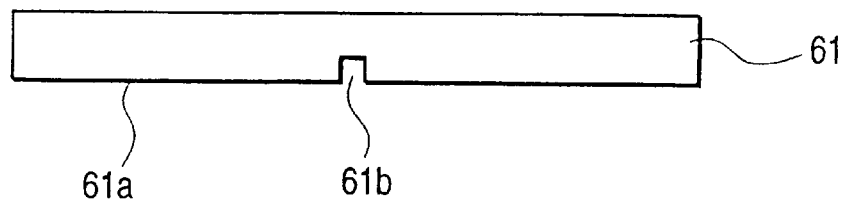
FIG. 14 is a side view of the transfer plate.

FIG. 13 is a bottom plan view of a transfer plate 61 for making an orifice plate in a sixth embodiment, and FIG. 14 is a cross-sectional view taken along line 14—14 in FIG. 13, and a concave rectangular parallelepiped groove 61b having e.g., a width of 200 $\mu$m, a depth of 600 $\mu$m and a length of 50 mm formed by etching is formed in the central portion of the minutely working pattern surface 61a of the transfer plate 61.

Figure 15:
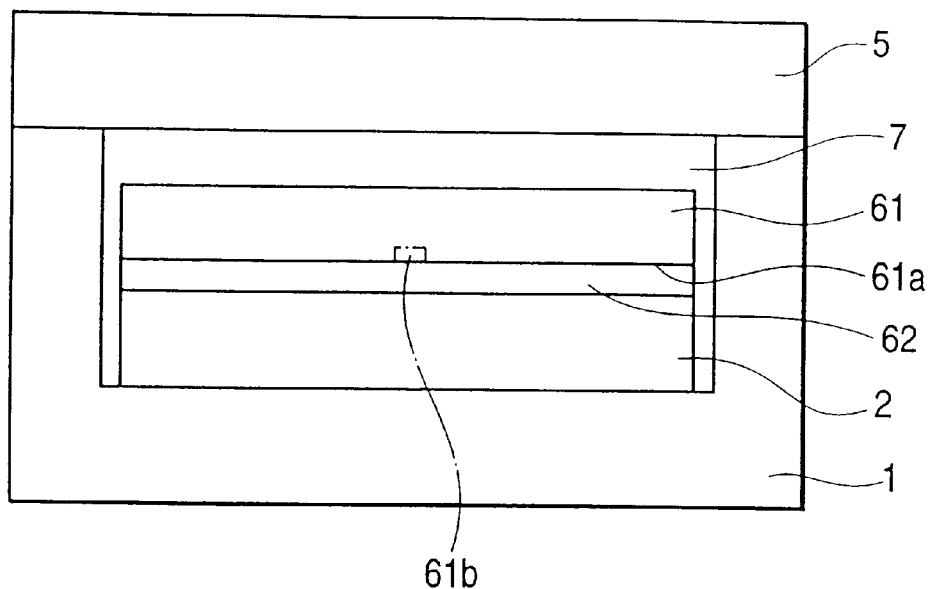
FIG. 15 is a cross-sectional view of a box type member before heated in a sixth embodiment of the present invention.

Referring to FIG. 15 which is a cross-sectional view of the interior of the box type member 1 before heated, a pressing plate 2 formed of PTFE resin having a thickness of 15 mm, a resin plate 62 formed of polysulfone (PSF) having a thickness of 0.1 mm and a transfer plate 61 formed of stainless steel having a thickness of 2 mm are stacked on the box type member 1 of which the height of the inner surface is 20 mm whereby a free space 7 having a thickness of 1 mm is provided in advance.

The box type member 1 on which the pressing plate 2, the resin plate 62 and the transfer plate 61 are stacked and to which a lid member 5 is fixed is put into the heating furnace 11 shown in FIG. 4 as in the first embodiment, and heating is started. The heating condition in the heating furnace 11 is, for example, a heating time 60 minutes ±1 minute at a heating temperature 300±5° C., and this heating condition is determined with the melting temperature and thermal deterioration of the resin plate 62 taken into account. At the heating step in the heating furnace 11, the relations among the pressing plate 2, the resin plate 62 and the transfer plate 61 stacked in the box type member 1 are changed as shown in FIGS. 16 and 17.

Figure 16:
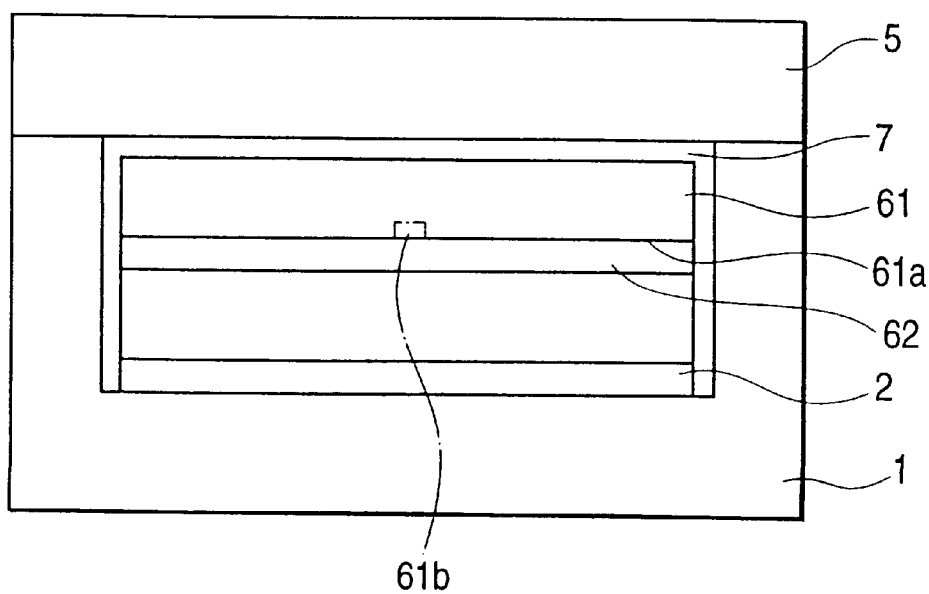
FIG. 16 is a cross-sectional view of the box type member being heated in the sixth embodiment.

That is, FIG. 16 is a cross-sectional view of the interior of the box type member 1 being heated, and the box type member 1, the pressing plate 2, the resin plate 62, the transfer plate 61 and the lid member 5 are heated and the temperatures of the respective members rise and the respective members begin to expand in conformity with their coefficients of thermal expansion. At the heating step in the present embodiment, the free space 7 in the box type member 1 is present so as to disappear when a temperature of 300° C. is reached. The free space 7 is reduced and the resin plate 62 lower in heat deformation temperature than the members around it is softened.

Figure 17:
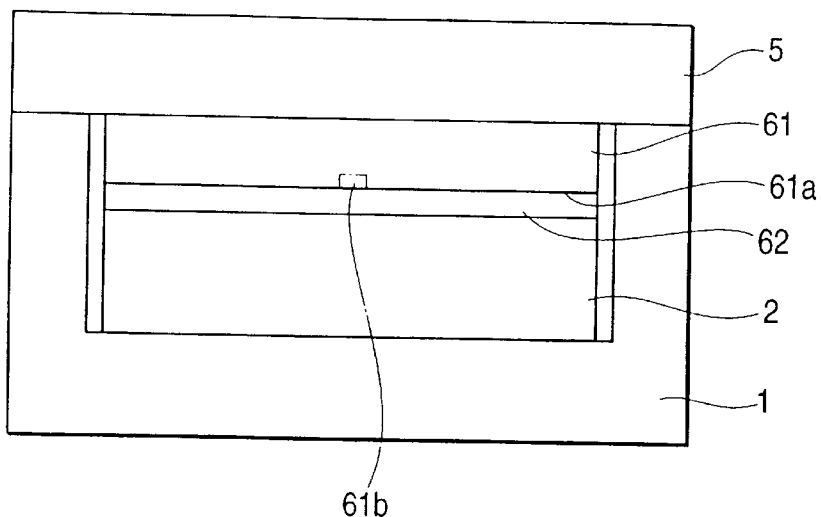
FIG. 17 is a cross-sectional view of the box type member in the sixth embodiment when it has reached a heating temperature.

Subsequently, when the free space 7 disappears as shown in FIG. 17, a portion of the resin plate 62 comes into the groove 61b of the transfer plate 61 and the minutely working pattern surface 61a of the transfer plate 61 is pressed against and transferred to the surface of the resin plate 62, and the thickness of the resin plate 62 is generally uniformized. Further, after a heating time of 60 minutes has passed, heating is stopped and cooling is started. This cooling step may be intactly made to continue after the stoppage of the heating, but as in the first embodiment, it is also possible to utilize a coolant such as water as shown in FIG. 7 to quench in order to shorter the cooling time.

In the present embodiment, after the stoppage of the heating, the box type member 1 is immersed in the cooling water in a liquid tank 22 with the members therein, and is cooled at a cooling speed of 270° C./min. And after it has become equal to the temperature of the water, the box type member 1 is taken out of the liquid tank 22, and the lid member 5 is detached and the pressing plate 2, the resin plate 62 and the transfer plate 61 are taken out.

The convex rectangular parallelepiped groove 61b of the minutely working pattern surface 61a is reversed and transferred to that surface of the taken-out resin plate 62 which has so far been in contact with the minutely working pattern surface 61a. In the present embodiment, the minutely working pattern has been reversed and transferred to only one surface of the resin plate 62, but the transfer plate 61 may be disposed on each of the upper and lower surfaces of the resin plate 62 to thereby reverse and transfer the minutely working pattern to the opposite surfaces of the resin plate 62.

Also, when the resin plate is used as an orifice plate for an ink jet head, resin of a small molding shrinkage rate is preferred from the viewpoint of the shape stability after molding. Also, in such a case as a thermal jet printer near which there is a heat source creating bubbles, resin having resistance to heat of 100° C. or higher is suitable.

Figure 18:
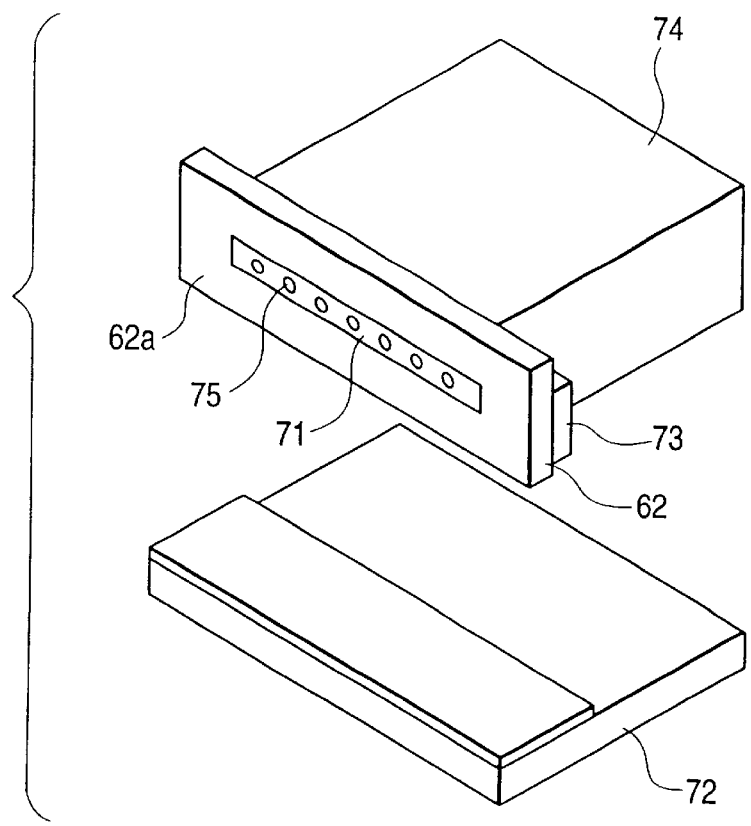
FIG. 18 is a schematic view of an ink jet head.

Referring to FIG. 18 which is a perspective view of an ink jet head, the resin plate 62 having a convex rectangular parallelepiped pattern 71 molded by the above-described means is used as an orifice plate. Also, a heater 73 which is energy generating means for liquid formation is provided on a face plate 72 and is supported by a top plate 74.

The rectangular parallelepiped pattern 71 is formed with orifice opening portions 75 having a diameter of 10 $\mu$m at a pitch of 30 $\mu$m by laser working. Also, when the orifice plate is to be formed, minute projections are installed on a metal mold so as to form the orifice opening portions 75 at a time, whereby the orifice opening portions 75 may be formed.

When the ink jet head of a bubble jet printer is made by the use of the orifice plate molded in the present embodiment and image outputting is effected, there is obtained a good characteristic of image quality free of ink discharge strain because the accuracy of the thickness of the orifice plate is good.

Figure 19:
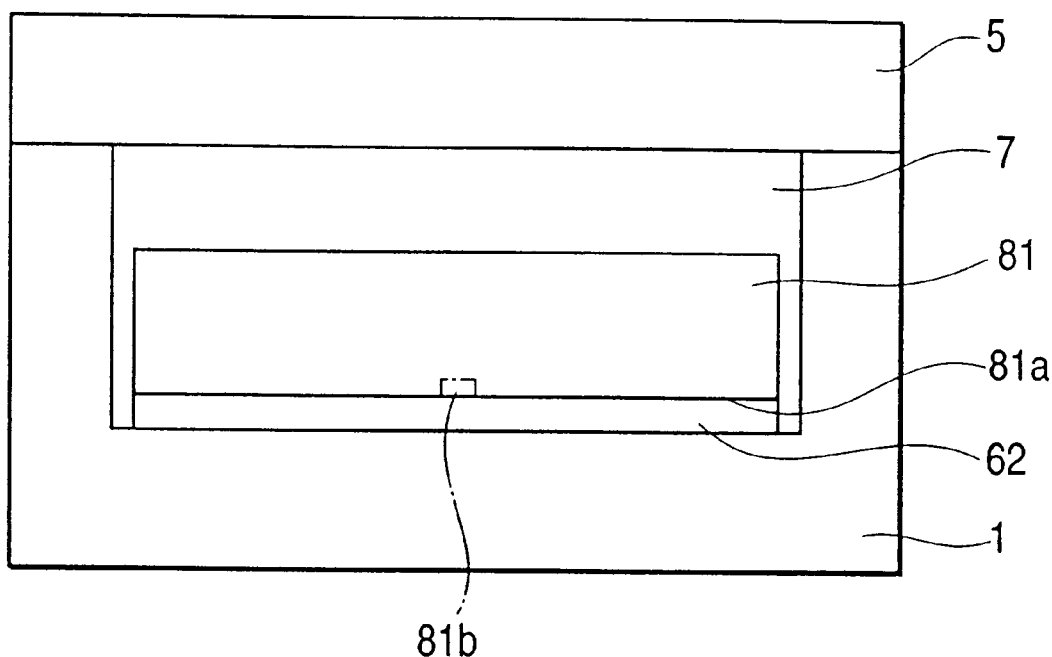
FIG. 19 is a cross-sectional view of a box type member before heated in a seventh embodiment of the present invention.

FIG. 19 is a cross-sectional view of the interior of a box type member 1 in a seventh embodiment, and use is not made of the pressing plate 2 used in the sixth embodiment, but use is made of a pressing plate and a transfer plate 81 formed of aluminum and comprising a transfer plate 61 having also the pressing function. Also, for example, concave rectangular parallelepiped grooves 81b each having a width of 50 $\mu$m, a length of 100 $\mu$m and a depth of 200 $\mu$m are continuously formed at intervals of 100 $\mu$m over a length of 500 mm in the minutely working pattern surface 81a of this pressing plate and transfer plate 81. The making of the resin plate 62 is effected substantially similarly to that in the first embodiment.

As described above, the minutely working method according to the present invention can easily form a minutely working pattern on the surface of film, a plate, a sheet or the like to thereby manufacture an optical element such as a Fresnel lens or a lenticular lens, or the orifice plate of an ink jet head portion inexpensively and easily.

Also, the coefficient of thermal expansion of the transfer plate is made greater than that of the box body, whereby the transfer plate can serve also as a pressing plate. Farther, by disposing two transfer plates on the opposite surfaces of thermoplastic resin film, it is also possible to form minutely working patterns on the opposite surfaces.

Also, the minutely working apparatus according to the present invention does not require any special and bulky machine and can manufacture by a simple technique and therefore, not only productively is improved, but also the manufacturing cost can be greatly decreased.

What is claimed is:

1. A minutely working method characterized by opposing the surface of a transfer member having a concave or convex pattern formed on said surface thereof and the surface of a workpiece to each other, heating said transfer member and thermally expanding said transfer member in the direction of a normal to said surface of said transfer member to thereby transfer said concave or convex pattern to said workpiece.

2. A minutely working method according to claim 1, wherein said workpiece and said transfer member are plates, said workpiece is formed of a thermoplastic material, said workpiece and said transfer member are stacked in a box body, and said box is heated, whereby said pattern is transferred to said workpiece.

3. A minutely working method according to claim 1, wherein the coefficient of thermal expansion of said transfer member and said workpiece is greater than that of said box body.

4. A minutely working method according to claim 1, wherein said concave or convex pattern is present in a plurality.

5. A minutely working method characterized by stacking a transfer member, a workpiece and a pressing member so that the surface of said transfer member having a concave or convex pattern formed on said surface thereof and the surface of said workpiece contact with each other, heating said pressing member and thermally expanding said pressing member to thereby urge said concave or convex pattern of said transfer member against the surface of said workpiece, and transfer said concave or convex pattern to said workpiece.

6. A minutely working method according to claim 5, wherein said workpiece and said transfer member are plates, said workpiece is formed of a thermoplastic material, said workpiece and said transfer member are stacked in a box body, and said box is heated, whereby said pattern is transferred to said workpiece.

7. A minutely working method according to claim 5, wherein the coefficient of thermal expansion of said transfer member and said workpiece is greater than that of said box body.

8. A minutely working method according to claim 5, wherein said concave or convex pattern is present in a plurality.

* * * * *

UNITED STATES PATENT AND TRADEMARK OFFICE
CERTIFICATE OF CORRECTION

PATENT NO.    : 6,315,937 B1                                                Page 1 of 1
DATED         : November 13, 2001
INVENTOR(S)   : Kazutaka Takeuchi et al.

It is certified that error appears in the above-identified patent and that said Letters Patent is hereby corrected as shown below:

<u>Column 10,</u>
Line 41, delete "on.said" and insert -- on said --.

Signed and Sealed this

Twenty-seventh Day of August, 2002

Attest:

Attesting Officer

JAMES E. ROGAN
*Director of the United States Patent and Trademark Office*